Feb. 12, 1963 E. R. T. MARQUETTE 3,077,181
PORTABLE CAGE FOR RABBITS
Filed Nov. 2, 1960 2 Sheets-Sheet 1
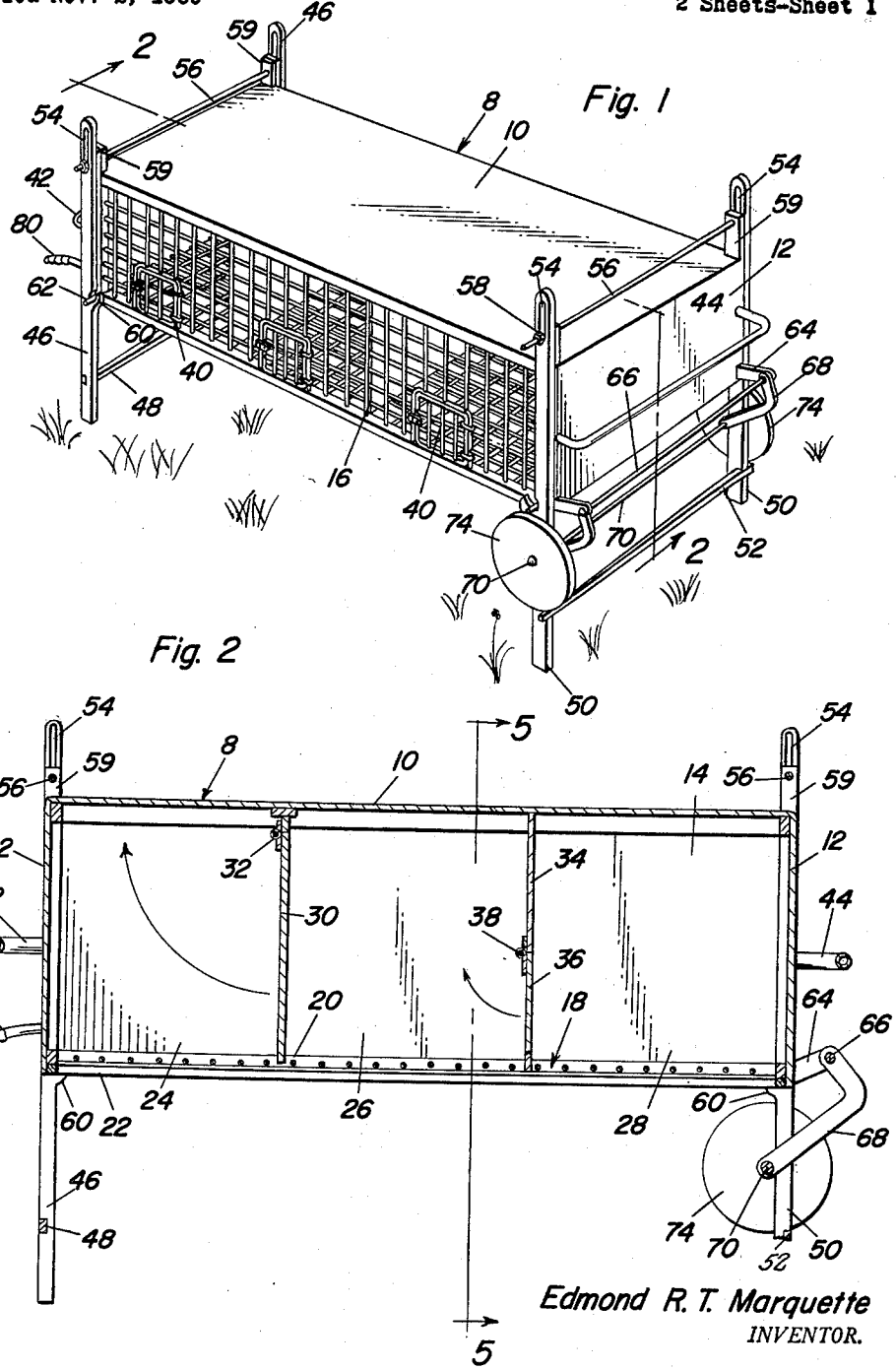
Edmond R. T. Marquette
INVENTOR.

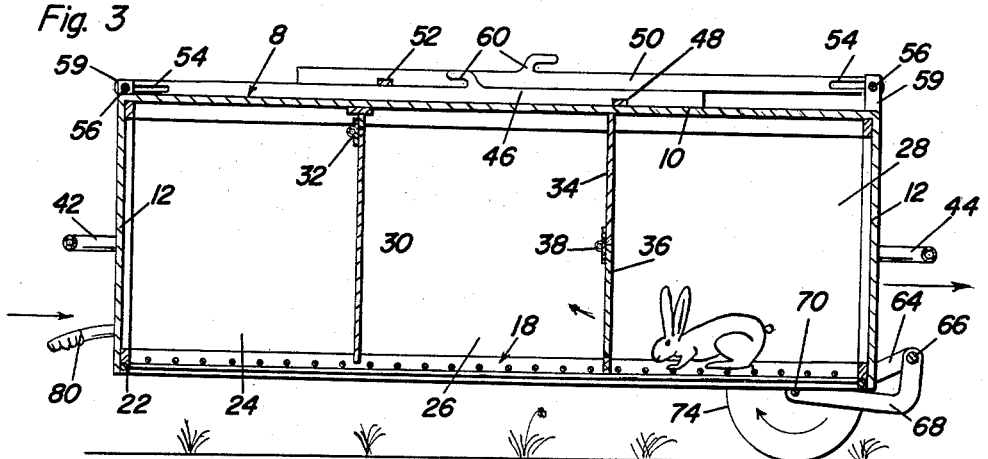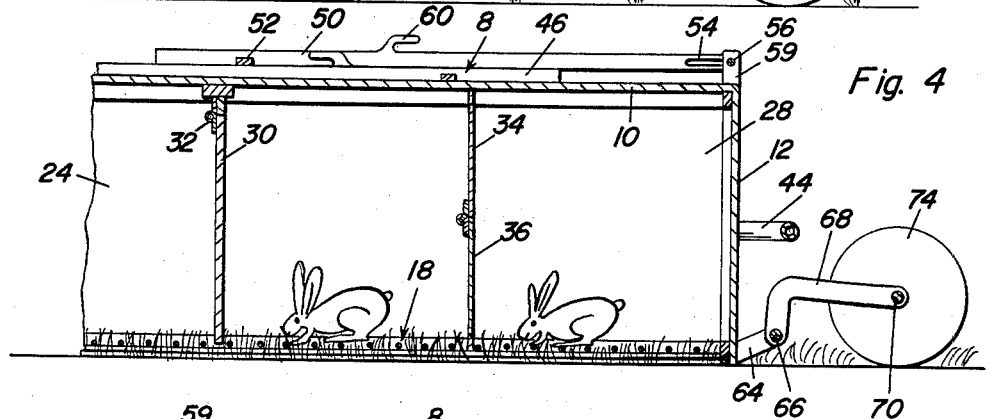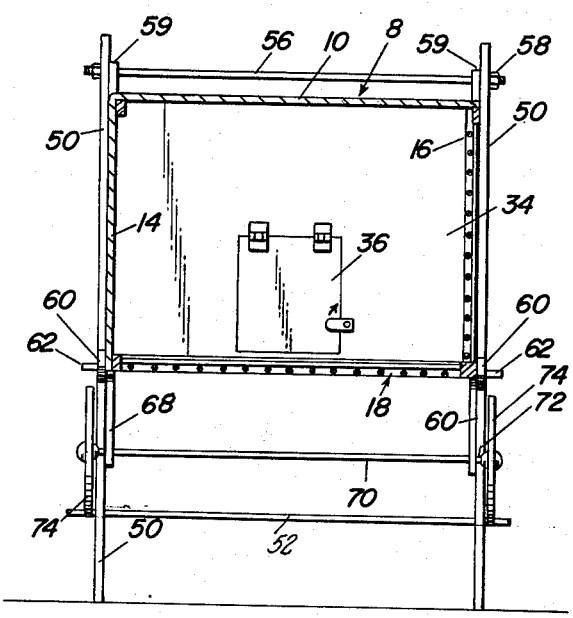

United States Patent Office 3,077,181
Patented Feb. 12, 1963

3,077,181
PORTABLE CAGE FOR RABBITS
Edmond R. T. Marquette, 519 School St., Houma, La.
Filed Nov. 2, 1960, Ser. No. 66,842
4 Claims. (Cl. 119—17)

The present invention relates to certain new and useful improvements in animal cages, generally speaking, but has more particular reference to special facilities provided on the cage and through the medium of which the usefulness of the cage is desirably enhanced.

As will be more clearly understood as the particular nature of the invention is revealed, the cage is expressly, but not necessarily, particularly designed and adapted to serve as a novel rabbit hutch. As is generally well known many parents refuse to permit their children to own rabbits for the reason that makeshift cages, as are generally used, are unsightly and constitute eyesores, so to speak. Further, odors arising from an accumulation of rabbit droppings is a highly objectionable situation. Confronted with this problem and enthusiastically concerned with a practical solution of the same it is an object of the instant matter to offer a novel cage which features highly desirable and practical innovations.

To the above suggested end the cage herein offered constitutes a so-called roll-raise-graze type which should be acceptable to everyone regardless of the residential area. This is so because the improved cage is neat in appearance, is readily movable and such that it may be shifted or moved from one place to another to cope with the aforementioned odors attending an accumulation of droppings by reason of the cage being kept in one position and apparently too close to the rabbit owner's residence. As a matter of fact experience has shown that the cage herein under advisement may be acceptably placed anywhere, including the front lawn, during the daytime. Each evening it may be moved quickly and easily to any other desired place.

The improved cage features handles at the ends thereof which may be used for bodily lifting and moving the cage about from place to place.

Another improvement resides in the provision of a cage which has a screenwire or an equivalent openwork bottom. This bottom permits the cage to be set down flatwise on a selected grassy spot or surface. The openings between the strands of wire function to allow the blades of grass to pop into the compartments of the cage thus enabling the rabbits or other occupants of the cage to graze until the owner decides that it is time to pick-up and shift the cage to a new locale for a fresh start.

Another improvement resides in providing an axle carrying wheels with the axle and wheels swingably mounted on a fixed support rod on the front end of the cage, the opposite end of the cage having handgrips whereby the user may pick-up the handgrip-equipped end and roll the cage around in wheelbarrow fashion to facilitate shifting it from one place to another.

Furthermore, novelty is predicated on properly constructed and paired front and rear legs. These legs are slidingly and pivotally mounted at normal upper ends on upper corner portions of the cage in a manner that the legs may be collapsed or folded against the top of the cage when it is desired to store the legs in an out-of-the-way position. Alternatively, the legs may be releasably fastened in vertical or upstanding positions in a manner to support the entire cage in a plane elevated above the plane of the ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a rabbit cage constructed in accordance with the invention and showing the same elevated above the ground.

FIG. 2 is a section taken on the central line 2—2 of FIG. 1, looking in the direction of the arrows.

FIG. 3 is a central longitudinal sectional view with parts appearing in elevation and which shows the elevating or supporting legs swung up and folded in or collapsed to an out-of-the-way position and with the ground engaging wheels in a roll-along position as indicated by the arrows.

FIG. 4 is a fragmentary view in section based on the right hand end portion of the structure seen in FIG. 3 but with the wheels swung out to what may be called an out-of-the-way position with the bottom of the cage resting on the ground in a grazing position; and FIG. 5 is a section on the vertical line 5—5 of FIG. 2 looking in the direction of the arrows.

It is anticipated that the cage or hutch should be approximately 6′ long, 2½′ wide and about 2′ high. The cage will be built of light metal or wood frame completely enclosed with wire or an equivalent reticulated sheet material. In the drawing the cage as an entity is denoted by the numeral 8 and is of rectangular box-like construction. Although it may be made completely of wire it is here shown as comprising a metal or an equivalent imperforate top 10, correspondingly constructed vertical ends 12 and a rear vertical imperforate wall 14. The front is preferably of openwork woven wire or equivalent construction as denoted generally at 16. The bottom wall is of openwork wire or screen construction as at 18 and it embodies a frame 20 supported on rods or the like 22 as perhaps best shown in FIG. 2. The cage illustrated (FIGS. 2 and 3) is preferably provided interiorly with compartments 24, 26 and 28 defined for example by dividers or partitioning walls. The wall 30 is hingedly mounted at 32 and may be swung up to an out-of-the-way position and held there by suitable means not shown. The partition or wall 34 has a hinged door, the door being shown at 36 and the hinge means at 38. The front wall is preferably provided with individual suitably constructed and mounted doors 40 for the separate compartments. At the left or rearward end a suitable fixedly mounted handlebar 42 is provided and used in conjunction with a corresponding handle or handlebar 44 at the front end. These handles may be obviously employed for picking the cage up and moving it around in any desired manner.

The cage is shown in a supported or elevated position in FIGS. 1, 2 and 5. This is accomplished by pairs of front and rear similarly constructed legs. The rear legs are denoted by the numeral 46 and may be braced and connected together at their lower end portions by a suitable horizontal brace 48. The lower end portions of the front legs 50 may likewise be rigidified by a stabilizing horizontal brace 52. The upper ends of all legs are provided with slots 54 through which threaded end portions of a mounting rod 56 extend. The threaded end portions are provided with assembling and retaining nuts 58. The rods are supported by upstanding lugs or brackets 59 mounted at the respective front and rear corner portions of the cage. With this construction and arrangement it will be obvious that the front and rear legs may be swung up and then folded in atop the cage to assume the collapsed or out-of-the-way position shown in FIG. 3 and also again in FIG. 4. All of the legs are provided with keeper hooks 60 at the intermediate portions which engage with keeper pins 62. Thus with the slotted and pivoted mounting means and with these keeper hooks and keeper pins the legs can be swung down and releasably fastened in perpendicular position in an obvious manner.

Attention is next directed to a pair of inclined forwardly extending brackets 64 supporting a horizontal rod 66 therebetween. This rod serves to accommodate L-shaped links or bell cranks 68 which have their long arms pivotally connected with an axle 70 which axle has end portions 72 (FIG. 5) extending across the inner or rear edge portions of the lower parts of the front legs 50 in the manner shown. The length of the axle is such that the wheels 74 are disposed to the left and right (FIG. 5) of the legs. In other words the wheels are disposed outwardly of the legs in the manner shown. With this construction the links and brackets and wheel supported axle constitute a novel means which allows the wheels to be positioned for transporting the cage underneath the same as shown in FIG. 3, or swung forwardly into an out-of-the-way position when in the grazing position shown in FIG. 4. Also the wheels and links and axle may be positioned as shown in FIGS. 1 and 2 whereupon the legs "lock" the wheels in this out-of-the-way non-dangling position in an obvious manner.

Repeating the "raise" position is illustrated in FIGS. 1, 2 and 5. The "roll" position is shown in FIG. 3 at which time the handles 80 may be used to allow the device to be shifted around in wheelbarrow fashion. The graze position is shown in FIG. 4.

When it is desired to return the cage to where it is usually kept when the rabbits are not grazing the following steps are followed.

(1) Raise the front end and swing the wheels under the cage.

(2) Pick up the back end of the cage by the handles and roll the cage to the dseired spot very much the same as you roll a wheelbarrow.

(3) Swing the rear legs, which are attached to each other, from the top of the cage to the ground and lift the back end of the cage and set the pins on the bottom of the cage into the hooks in the middle part of the legs.

(4) Swing the front legs, which are attached to each other, from the top of the cage to the ground and lift the front end of the cage and set the pins on the bottom of the cage into the hooks in the middle part of the legs. As the wheels extend beyond the width of the cage, the front legs will force the wheels into position they are shown in FIG. 1.

It is to be added that the aforementioned brackets 64 disposed at the angle shown constitute runners or skids which make it possible to slide the cage a short distance by lifting the rear end of the cage by the handles and shifting the cage in an obvious manner.

The cage should be made strong but as light as possible so that it is permissible for a comparatively small boy unaided to handle it changing it from raise, to roll, to graze positions and vice versa in little or no time. The animals on the inside of the cage will be safe from other animals on the outside because if the outside animals should dig under the cage they will find the wire bottom there to surprise them.

The foregoing is considered as illustrative only of the principles of the invention. Further, since numerous modifications and changes will readily occur to those skilled in the art, it is not desired to limit the invention to the txact construction and operation shown and described, and accordingly all suitable modifications and equivalents may be resorted to, falling within the scope of the invention as claimed.

What is claimed as new is as follows:

1. An animal cage comprising an enclosure having a bottom comprised of a foaminous network for grazing needs, a plurality of corners on said enclosure, at least one partition means extending across said enclosure dividing it into multiple compartments, said partition means being pivotable to an out-of-use position to vary the number of compartments in said enclosure, said enclosure further including one wall portion having access forming means therein for providing access to said individual compartments, outstanding lugs attached to at least four corners of said enclosure, a support means comprising a pair of front legs and a pair of rear legs having upper slotted ends pivotally connected to said outstanding lugs, other corner portions of said enclosure having keeper pins, median portions of said legs being provided with outwardly opening geeper hooks and said keeper hooks being releasably engaged with said keeper pins, whereby said legs may support the enclosure above the ground when the keeper lugs are engaged with the keeper pins and the enclosure may be lowered to rest upon the ground for grazing needs when the legs are pivoted about their respective lugs to a stored position on the enclosure.

2. The structure defined in claim 1 wherein the enclosure comprises a pair of end portions, a pair of brackets on one end of the closure provided with a cross-rod, L-shaped links having short arms pivotally connected with said cross-rod and having long arms underlying a portion of the bottom of said enclosure, wheels connected to said long arms, handle means at the other end of said enclosure, whereby when the legs are stored on the enclosure the wheels may serve to support said one end of the enclosure when used in conjunction with said handle means to move said enclosure in wheelbarrow fashion or said wheels may be pivoted by means of said L-shaped links to a position allowing the enclosure to rest upon the ground for grazing needs.

3. An animal cage comprising an enclosure having a bottom comprised of a foraminous network for grazing needs, a plurality of corners on said enclosure, said enclosure further including one wall portion having access forming means therein for providing access to said individual compartments, outstanding lugs attached to at least four corners of said enclosure, a support means comprising a pair of front legs and a pair of rear legs having upper slotted ends pivotally connected to said outstanding lugs, other corner portions of said enclosure having keeper pins, median portions of said legs being provided with outwardly opening keeper hooks and said keeper hooks being releasably engaged with said keeper pins, whereby said legs may support the enclosure above the ground when the keeper lugs are engaged with the keeper pins and the enclosure may be lowered to rest upon the ground for grazing means when the legs are pivoted about their respective lugs to a stored position on the enclosure.

4. The structure defined in claim 3 wherein the enclosure comprises a pair of end portions, a pair of brackets on one end of the enclosure provided with a cross-rod, L-shaped links having short arms pivotally connected with said cross-rod and having long arms underlying a portion of the bottom of said enclosure, wheels connected to said long arms, handle means at the other end of said enclosure, whereby when the legs are stored on the enclosure the wheels may serve to support said one end of the enclosure when used in conjunction with said handle means to move said enclosure in wheelbarrow fashion or said wheels may be pivoted by means of said L-shaped links to a position allowing the enclosure to rest upon the ground for grazing needs.

References Cited in the file of this patent

UNITED STATES PATENTS

| | | |
|---|---|---|
| 494,706 | Matthews | Apr. 4, 1893 |
| 1,267,625 | Brindley | May 28, 1918 |
| 2,667,143 | Havens | Jan. 26, 1954 |
| 2,703,554 | Haggard et al. | Mar. 8, 1955 |
| 2,764,129 | Haggard | Sept. 25, 1956 |
| 2,790,414 | Rossow | Apr. 30, 1957 |
| 2,857,880 | Stone | Oct. 28, 1958 |
| 2,892,562 | Smithson | June 30, 1959 |